United States Patent
Fu et al.

(10) Patent No.: US 9,479,357 B1
(45) Date of Patent: Oct. 25, 2016

(54) DETECTING MALWARE ON MOBILE DEVICES BASED ON MOBILE BEHAVIOR ANALYSIS

(75) Inventors: Jie Fu, Chengdu (CN); Zhigang Kan, Beijing (CN); Gehua Huang, Beijing (CN); Yuan Yuan Li, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 1671 days.

(21) Appl. No.: 12/718,758

(22) Filed: Mar. 5, 2010

(51) Int. Cl.
*H04L 29/00* (2006.01)
*H04L 12/58* (2006.01)
*H04L 29/06* (2006.01)

(52) U.S. Cl.
CPC ............. *H04L 12/585* (2013.01); *H04L 51/12* (2013.01); *H04L 51/38* (2013.01); *H04L 63/0227* (2013.01)

(58) Field of Classification Search
CPC . H04L 12/585; H04L 12/5895; H04L 51/12; H04L 63/0227; H04L 63/1491; H04L 51/38
USPC .............. 726/23–25; 713/182–190, 200–201
See application file for complete search history.

(56) References Cited

U.S. PATENT DOCUMENTS

| | | | | |
|---|---|---|---|---|
| 2002/0013910 A1* | 1/2002 | Edery et al. | | 713/201 |
| 2002/0066034 A1* | 5/2002 | Schlossberg et al. | | 713/201 |
| 2003/0079145 A1* | 4/2003 | Kouznetsov et al. | | 713/200 |
| 2003/0229801 A1* | 12/2003 | Kouznetsov et al. | | 713/200 |
| 2003/0233566 A1* | 12/2003 | Kouznetsov et al. | | 713/200 |
| 2003/0233574 A1* | 12/2003 | Kouznetsov et al. | | 713/201 |
| 2004/0003276 A1* | 1/2004 | Kouznetsov et al. | | 713/200 |
| 2004/0010703 A1* | 1/2004 | Kouznetsov et al. | | 713/200 |
| 2004/0025042 A1* | 2/2004 | Kouznetsov et al. | | 713/200 |
| 2007/0214088 A1* | 9/2007 | Graham et al. | | 705/51 |
| 2007/0240222 A1* | 10/2007 | Tuvell et al. | | 726/24 |
| 2008/0086776 A1* | 4/2008 | Tuvell et al. | | 726/24 |
| 2010/0011432 A1* | 1/2010 | Edery et al. | | 726/11 |
| 2011/0154490 A1* | 6/2011 | DeLuca et al. | | 726/23 |

OTHER PUBLICATIONS

Oberheide, J. et al., "Virtualized In-Cloud Security Services for Mobile Devices," 2008, pp. 1-5, [Online] [Retrieved on Mar. 28, 2011] Retrieved from the Internat<URL:http://www.eecs.umich.edu/fjgroup/pubs/mobivirt08-mobilecloud.pdf>.

* cited by examiner

*Primary Examiner* — Don Zhao
(74) *Attorney, Agent, or Firm* — Fenwick & West LLP (57) ABSTRACT

Applications running on a mobile device are monitored for suspicious actions utilizing mobile features of the mobile device. Once a suspicious action performed by an application is detected, that suspicious action is suspended. Information about the suspicious action and the application is collected and transmitted to a remote security system over a wireless network. The security system analyzes the suspicious action and the application to determine a security rating of the application, and transmit the security rating back to the mobile device. Whether the application is malware and whether the suspicious action should be allowed to continue are both determined based on the security rating.

17 Claims, 4 Drawing Sheets

DETECTING MALWARE ON MOBILE DEVICES BASED ON MOBILE BEHAVIOR ANALYSIS

BACKGROUND

1. Field of Disclosure

The disclosure generally relates to the field of computer security, in particular to detecting malicious software applications on mobile devices.

2. Description of the Related Art

A wide variety of malicious software (malware) can attack modern computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware on personal computers, such as signature string scanning, are proven to be ineffective for detecting malware on mobile devices such as mobile phones. Because the mobile devices typically have limited computing capacity, resource-demanding malware detection techniques such as virtual execution and sandboxing cannot be applied in the mobile devices. Similarly, because of their resource limitations, collecting virus samples is also difficult on mobile devices, making fingerprint-based malware detection techniques unreliable for detecting malware on mobile devices. In addition, because fingerprint-based malware detection techniques rely upon predefined fingerprints of known threads, they cannot detect unknown threads. Accordingly, there is a need for new techniques that can detect malware on mobile devices.

SUMMARY

Embodiments of the present disclosure include methods (and corresponding systems and non-transitory computer-readable storage media) for detecting malware on mobile devices.

One aspect of the present disclosure is a computer-implemented method for detecting a malicious application on a mobile device, comprising: detecting a suspicious action performed by an application running on the mobile device, the suspicious action attempting to access a mobile feature of the mobile device; suspending the suspicious action performed by the application; collecting information about the suspicious action and the application; transmitting the collected information to a remote computer through a wireless network; receiving a security rating of the application through the wireless network, the security rating comprising a measurement of a likelihood of the application for being malware; and determining whether the application is malware based on the security rating.

Another aspect of the present disclosure is a mobile device for detecting a malicious application on the mobile device, comprising: a non-transitory computer-readable storage medium storing executable computer program code, the computer program code comprising program code for: detecting a suspicious action performed by an application running on the mobile device, the suspicious action attempting to access a mobile feature of the mobile device; suspending the suspicious action performed by the application; collecting information about the suspicious action and the application; transmitting the collected information to a remote computer through a wireless network; receiving a security rating of the application through the wireless network, the security rating comprising a measurement of a likelihood of the application for being malware; and determining whether the application is malware based on the security rating.

Still another aspect of the present disclosure is a non-transitory computer-readable storage medium encoded with executable computer program code for detecting a malicious application on a mobile device, the computer program code comprising program code for: detecting a suspicious action performed by an application running on the mobile device, the suspicious action attempting to access a mobile feature of the mobile device; suspending the suspicious action performed by the application; collecting information about the suspicious action and the application; transmitting the collected information to a remote computer through a wireless network; receiving a security rating of the application through the wireless network, the security rating comprising a measurement of a likelihood of the application for being malware; and determining whether the application is malware based on the security rating.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

Figure (FIG. 1 is a high-level block diagram of a computing environment according to one embodiment of the present disclosure.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or

System Environment

Figure 1:
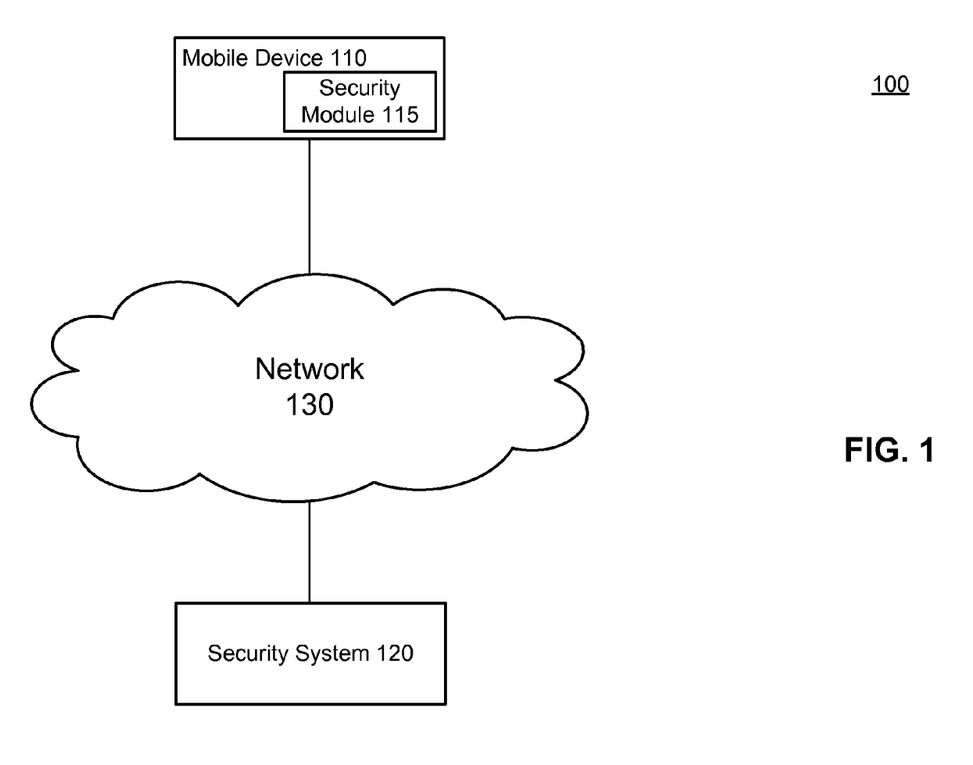

FIG. 1 is a high-level block diagram that illustrates a computing environment 100 for detecting malware in mobile devices, according to one embodiment of the present disclosure. As shown, the computing environment 100 includes a mobile device 110 and a security system 120 connected through a network 130. Only one of each entity is illustrated in order to simplify and clarify the present description. There can be other entities in the computing environment 100 as well.

A mobile device 110 is an electronic device with mobile features (e.g., telephonic functionality) that can host malicious software. One example of a mobile device 110 is a mobile telephone (e.g., a smartphone) executing, for example, a mobile operating system (OS) such as Microsoft Windows Mobile, Apple iPhone OS, Google Android, and Palm WebOS. Another example of a mobile device 110 is a device having networking and computing functionality, such as a personal digital assistant (PDA). A mobile device 110 typically stores numerous computer files that can host malicious software.

Malicious software, sometimes called "malware," is generally defined as software that executes on the mobile device 110 surreptitiously or that has some surreptitious functionality. Malware can take many forms, such as parasitic viruses that attach to legitimate files, worms that exploit weaknesses in the mobile device's security in order to infect the mobile device 110 and spread to other mobile devices 110, Trojan horse programs that appear legitimate but actually contain hidden malicious code, and spyware that monitors user inputs and/or other actions on the mobile device 110 in order to capture sensitive information or display advertisements.

The mobile device 110 executes a security module 115 for detecting malware running on the mobile device 110. The security module 115 can be, for example, incorporated into the mobile OS of the mobile device 110 or part of a separate comprehensive security package. In one embodiment, the security module 115 is provided by the entity that operates the security system 120. The security module 115 can communicate with the security system 120 via the network 130 for information related to malware detection.

The security module 115 monitors applications running on the mobile device 110 to detect suspicious actions (or sequence of actions) in real-time, suspends (or blocks) the detected suspicious actions, and transmits related information to the security system 120 via the network 130. Examples of the transmitted information include information describing the suspicious actions (e.g., timing, frequency) and fingerprints of the applications performing the suspicious actions (also called the "suspicious application"). The security module 115 receives security ratings of the suspicious applications from the security system 120. A security rating comprises an assessment of a likelihood of a corresponding suspicious application being malicious (versus being legitimate). For example, the security rating can have a set of values such as the following: "Low", "Middle", "High", and "Serious", where "Low" indicates a low likelihood of the application being malicious, and "Serious" indicates a very high likelihood of the application being malicious. Alternatively, the security rating can be a continuous value ranging from 0 to 1, with a score of 0 indicating a very low likelihood of the application being malicious and a score of 1 indicates a very high likelihood of the application being malicious. The security module 115 determines whether the suspicious application is malware and/or whether to allow the suspicious action based on the received security rating.

In one embodiment, in addition to (or instead of) monitoring suspicious actions, the security module 115 monitors web browsing activities on the mobile device 110. After detecting an action to visit a certain web page (or website), the security module 115 suspends the action and transmits information about the web page (e.g., its Uniform Resource Locator (URL)) to the security system 120. The security module 115 subsequently receives a security rating of the web page, and allows the action to go through only if the security rating indicates that the web page is likely legitimate (e.g., the security rating is below a threshold value). Otherwise, if the security rating indicates that the web page is likely malicious, the security module 115 prompts the user with a warning about the malicious nature of the web page, and only continues the action upon receiving an explicit authorization from the user.

The security system 120 is a hardware device and/or software program configured to receive information about applications performing suspicious actions on the mobile devices 110, analyze the suspicious actions and/or the suspicious applications to determine security ratings of the suspicious applications, and send the security ratings back to the mobile devices 110. In one embodiment, one or more of the functions of the security system 120 is provided by a cloud computing environment. As used herein, cloud computing refers to a style of computing in which dynamically scalable and often virtualized resources are provided as a service over the network 130.

The security system 120 determines the security rating of a suspicious application by traversing a decision tree based on information related to the suspicious action and/or the suspicious application. Alternatively or additionally, the security system 120 may apply one or more security rules, and/or conduct statistical analysis on data collected from multiple mobile devices 110 to determine the security rating.

In one embodiment, the security system 120 also receives information about web browsing activities detected on the mobile device 110, determines security scores for the web page (or website) to be visited, and returns the security scores to the mobile device 110. For example, the security system 120 can access a central database that includes information about websites to determine the security score of a particular website (i.e., likelihood of the website for being malicious versus being legitimate). As another example, the security system 120 can determine the security score of a website using techniques such as virtual execution and sandboxing (e.g., executing a browser in a virtual execution system to visit the website and analyzing the consequences of the visit), and/or based on related feedback from other mobile devices 110 (e.g., statistical analysis, behavior analysis).

The network 130 enables communications between the mobile device 110 and the security system 120 and may include a voice and/or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

Computer Architecture

Figure 2:
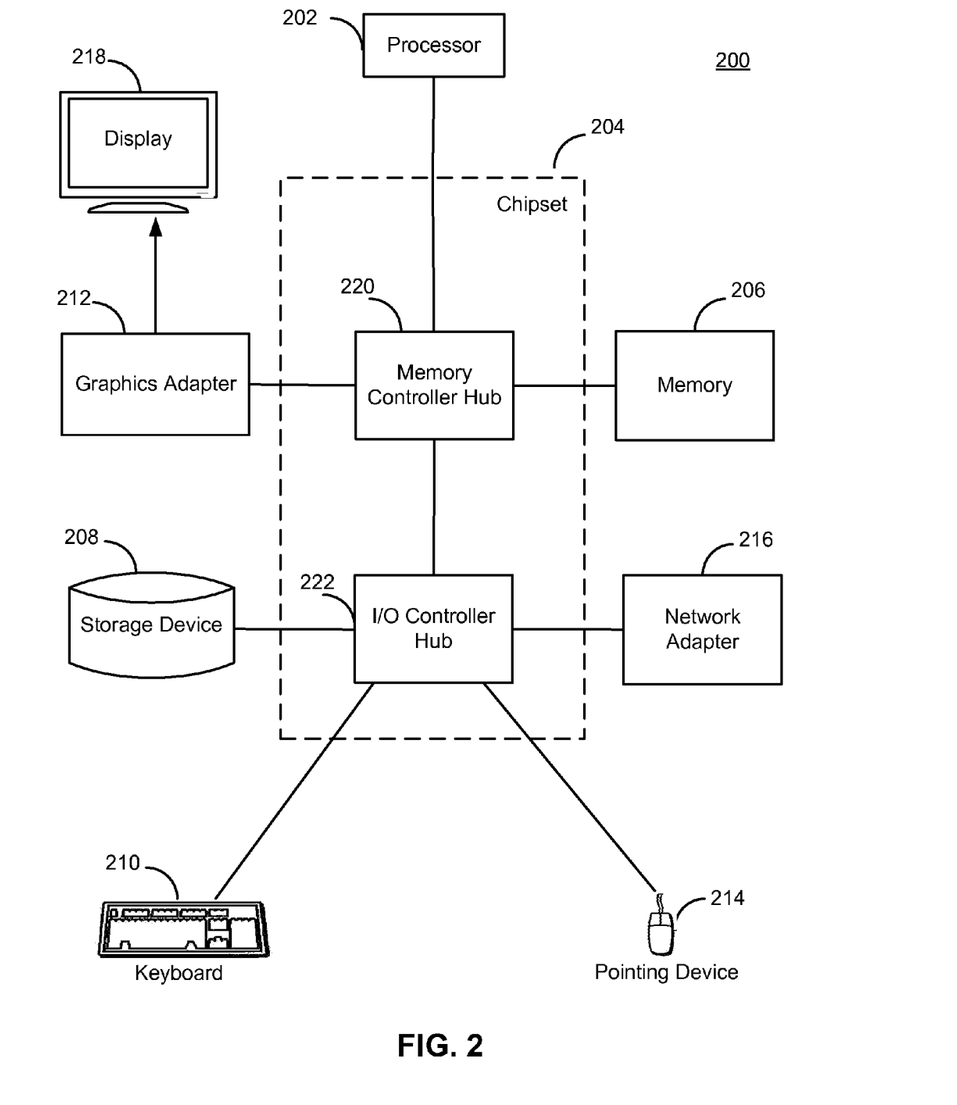
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the security system 120 might comprise multiple blade servers working together to provide the functionality described herein. As another example, the mobile device 110 might comprise a mobile telephone with limited processing power. The computers 200 can lack some of the components described above, such as keyboards 210, graphics adapters 212, and displays 218.

Example Architectural Overview of the Security Module

Figure 3:
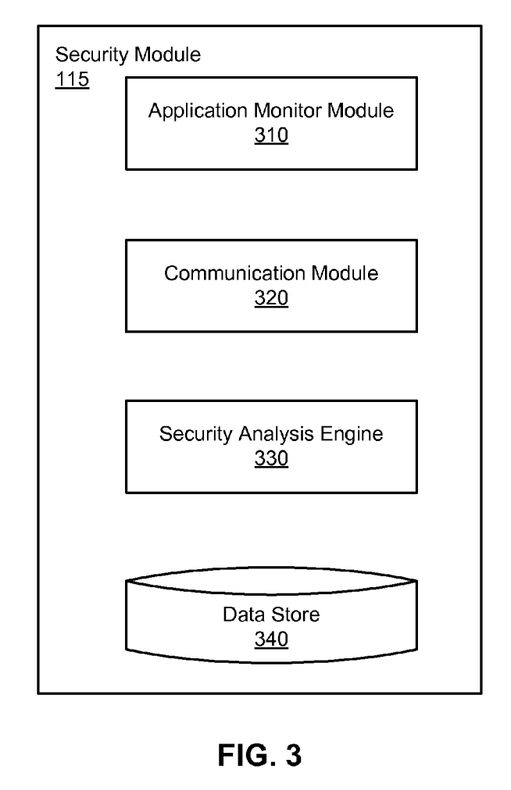
FIG. 3 is a high-level block diagram illustrating modules within a security module according to one embodiment of the present disclosure.

FIG. 3 is a high-level block diagram illustrating a detailed view of modules within the security module 115 according to one embodiment. Some embodiments of the security module 115 have different and/or other modules than the ones described herein. Similarly, the functions can be distributed among the modules in accordance with other embodiments in a different manner than is described here. As illustrated, the security module 115 includes an application monitor module 310, a communication module 320, a security analysis engine 330, and a data store 340.

The application monitor module 310 monitors applications running on the mobile device 110 and detects suspicious actions (or sequence of actions) performed by the applications in real-time. Suspicious actions are actions that legitimate applications normally would not perform. Malware often attempts to access certain mobile specific features of the mobile device 110 to cause damage (e.g., incur financial cost) on the mobile device 110. Examples of such attempts are listed below:

- attempts to send a SMS (Short Message Service)/MMS (Multimedia Messaging Service)/email,
- attempts to initiate a telephone call,
- attempts to access a phone book or a contact list (e.g., stored on a SIM (Subscriber Identity Module) card or elsewhere on the mobile device 110),
- attempts to access a digital wallet,
- attempts to initiate a network connection (GPRS, EDGE (Enhanced Data rates for Global Evolution), or 3G),
- attempts to access Bluetooth,
- attempts to access IrDA (Infrared Data Adapter),
- attempts to access WiFi (Wireless Fidelity),
- attempts to access an on-device GPS (Global Positioning System) sensor,
- attempts to access an on-device motion sensor (e.g., accelerometer),
- attempts to access an on-device camera,
- attempts to access an on-device microphone.

An attempt to access a mobile feature by itself is not necessarily a suspicious action, since legitimate applications also make such attempts for legitimate purposes. However, the attempts made by malware often share some characteristics that are uncommon among the attempts made by legitimate applications. For example, a legitimate application only sends out a SMS/MMS message after explicit user authorization (e.g., clicking the "send" button), and does not send out messages automatically in the background. On the other hand, because of it surreptitious nature, malware typically sends out SMS/MMS messages automatically in the background. Accordingly, the suspicious actions can be defined using contextual characteristics such as whether the action is performed in the background (versus with explicit user authorization). Below is a list of example definitions of suspicious actions related to sending SMS/MMS messages:

- send a SMS/MMS message in the background,
- send a SMS/MMS message to a phone number not in the contact list,
- send a SMS/MMS message to a service provider number,
- send a SMS/MMS message to all phone numbers in the contact list,
- send SMS/MMS messages at a high frequency (exceeding 10 messages per minute),
- send a SMS/MMS message between 11:00 PM~7:00 AM (typical bedtime for mobile device users).

The definitions of the suspicious actions can be received from the security system 120 and/or built into the security module 115.

In one embodiment, in addition to (or instead of) detecting individual suspicious actions, the application monitor module 310 detects sequences (or combinations) of actions that collectively are suspicious (i.e., uncommon among legitimate applications). Below are definitions of two sequences of actions that collectively are suspicious (called suspicious sequences):

- malicious application programming interface (API) sequence:
  (1) modify system registry, followed by
  (2) access personal information, followed by
  (3) create a network connection;
- access sensitive device information sequence:
  (1) access GPS sensor or motion sensor, followed by
  (2) create a network connection.

After the application monitor module 310 detects a suspicious action (or sequence) performed by an application running on the mobile device 110, the application monitor module 310 suspends (or blocks) the operation of the application to prevent the suspicious action (or sequence) from negatively affecting the mobile device 110. In addition, the application monitor module 310 collects information related to the suspicious action and/or the suspicious application. Examples of the information collected for a suspicious attempt by an application to send a SMS message are listed below:

the SMS number of the mobile device 110, the SMS receiver number of the SMS message, the installation path of the application, the register information of the application, whether the application was launched automatically when the system starts up, the fingerprint of the application (or the application itself), the content of the SMS message.

The application monitor module 310 works with the communication module 320 to transmit all or a part of the collected information to the security system 120, and optionally stores the collected information in the data store 340.

The communication module 320 communicates with the security system 120 to provide information about the suspicious actions and/or the suspicious applications, and to receive security ratings of the suspicious applications from the security system 120. The communication module 320 stores the received information in the data store 340 together with other related information for the suspicious applications.

The security analysis engine 330 determines whether a suspicious application is malware by analyzing the received security rating of the suspicious application. For example, assuming the security rating is a value ranging from 0 to 1, if the security rating exceeds a predetermined threshold value (e.g., 0.5), then the security analysis engine 330 determines that the suspicious application is malware, and otherwise legitimate.

In addition, the security analysis engine 330 determines whether to allow the suspicious action to continue based on the security rating. In one embodiment, the security analysis engine 330 treats the suspicious actions differently based on their corresponding security ratings. For example, the table below lists the security ratings and their corresponding treatments the security analysis engine 330 may apply to the associated suspicious actions.

| Security Rating | Treatment |
| --- | --- |
| [0, 0.4) or "Low" | Resume the execution of the suspicious application. |
| [0.4, 0.6) or "Middle" | Display a pop-up alert warning the suspicious action and resume the execution of the suspicious application. |
| [0.6, 0.8) or "High" | Display a pop-up alert warning the suspicious action, prompt the user to explicitly authorize the suspicious action, resume the execution of the suspicious application only after receiving explicit authorization. |
| [0.8, 1) or "Serious" | Terminate the suspicious application and delete it from the mobile device 110. |

The logic illustrated in the table above can be received from the security system 120 and/or built into the security module 115.

The data store 340 stores data used by the security module 115. Examples of such data include information collected for the applications running on the mobile device 110 (e.g., suspicious actions, fingerprints), received security ratings, and information about the security system 120 (e.g., IP address). The data store 340 may be a relational database or any other type of database that stores the data, such as a flat file.

Example Architectural Overview of the Security System

Figure 4:
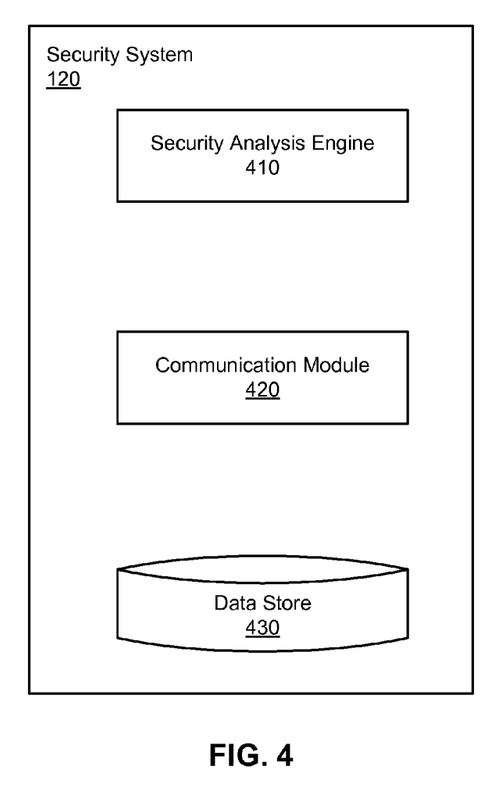
FIG. 4 is a high-level block diagram illustrating modules within a security system according to one embodiment of the present disclosure.

FIG. 4 is a high-level block diagram illustrating a detailed view of modules within the security system 120 according to one embodiment. Some embodiments of the security system 120 have different and/or other modules than the ones described herein. Similarly, the functions can be distributed among the modules in accordance with other embodiments in a different manner than is described here. As illustrated, the security system 120 includes a communication module 410, a security analysis engine 420, and a data store 430.

The communication module 410 receives information about applications performing suspicious actions from the security modules 115 running on the mobile devices 110, stores the received information in a central database (e.g., the data store 430), and provides security ratings determined by the security analysis engine 420 for the suspicious applications to the security modules 115.

The security analysis engine 420 analyzes the received information about an application performing a suspicious action on the mobile device 110 to determine a security rating for the suspicious application. In one embodiment, the security analysis engine 420 conducts statistical analysis on data collected from multiple mobile devices 110 to determine the security rating. For example, if the application that performed the suspicious action has been determined to have a high security rating (the application is likely malicious) on other mobile devices 110 (e.g., with identical fingerprints), the security analysis engine 420 may determine a high security rating for the suspicious application, even if the suspicious action itself has not been observed before. As another example, if the suspicious action (or sequence) has been performed by other applications, and most of the applications have been assigned high security ratings, the security analysis engine 420 may determine a high security rating for the suspicious application even if the application itself has not been observed before. Thus, the accuracy of the security ratings the security analysis engine 420 determines for a suspicious action and/or a suspicious application can improve as it collects more related information from mobile devices 110.

Alternatively or additionally, the security analysis engine 420 may traverse a decision tree based on information related to the suspicious action (e.g., whether the action was performed automatically in the background), the suspicious application (e.g., whether the application is signed by a reputable software publisher), and/or the mobile device 110 (e.g., whether the mobile device 110 has reported similar suspicious actions before). The decision tree itself may be induced from the data collected from the multiple mobile devices 110 using a decision tree induction algorithm. The security analysis engine 420 may apply other decision making systems such as the Bayesian decision-making system to determine the security scores. Further, the security analysis engine 420 may apply one or more security rules derived from a set of security policies to determine the corresponding security rating. For example, if a security policy prohibit sending SMS messages in the background or to a service provider number, the security analysis engine 420 automatically determines a high security rating (e.g., "High", "Serious") in response to suspicious actions that fall into the prohibited category, such that applications making such attempts either are terminated, or continue only upon explicit user authorization. The table below lists a set of example security rules for determining the security ratings of suspicious attempts to send SMS messages:

| Applicable Suspicious Action (or Sequence) | Resulting Security Rating |
|---|---|
| Send SMS messages at a high frequency (exceeding 10 messages per minute). | "Low" |
| Send a SMS message to a number likely to be a service provider number (e.g., 10086, 1066907703, and 10658830). | "Middle" |
| Send a SMS message to a number not in the contact list AND at a high frequency. | "High" |
| Send a SMS message to a number likely to be a service number AND at a high frequency. | "High" |
| Send a SMS message to a number likely to be a service number AND at a high frequency AND between 11:00 PM~7:00 AM. | "Serious" |

In one embodiment, the security analysis engine 420 transmits some security rules to the security modules 115 to enforce locally (also called the "local security rules"). Examples of the local security rules include security rules that are well established (e.g., security rules generated by human experts) or derived from important security policies. The security modules 115 store the local security rules on the mobile devices 110 and apply the local security rules to determine security ratings when desirable (e.g., when the security system is unavailable or nonresponsive).

The security analysis engine 420 may also apply additional malware detection techniques such as virtual execution and sandboxing to further analyze the suspicious applications. For example, assuming the security module 115 uploads a suspicious application to the security system 120, the security analysis engine 420 executes (or installs) the suspicious application in a self-enclosed environment (e.g., an emulator, a sand box), detects suspicious actions (or take snapshots) of this application, and analyzes these actions to determine a security rating for the suspicious application. If the suspicious application is indeed malware, the application will exhibit suspicious actions over the course of its execution, and the security analysis engine 420 will determine a security rating based on these suspicious actions. In one embodiment, the security analysis engine 420 does not terminate the suspicious application after it exhibits a dangerous action (e.g., attempting to delete the system registry), and leaves the suspicious application running.

The data store 430 stores data used by the security system 120. Examples of such data include the information received from the security modules 115, and information about the mobile devices 110, to name a few. The data store 430 may be a relational database or any other type of database.

Overview of Methodology for the Security Module

Figure 5:
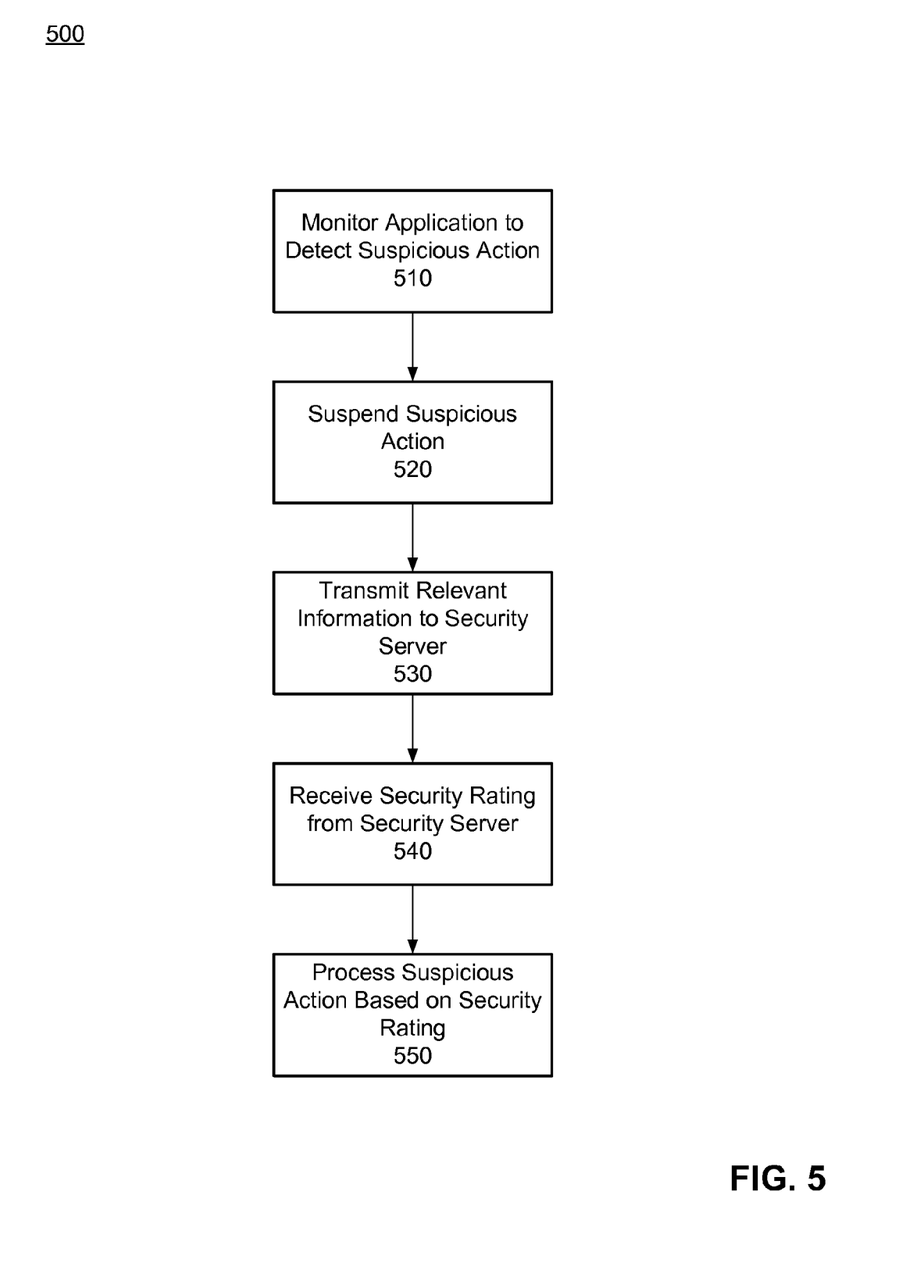
FIG. 5 is a flow diagram illustrating a process for detecting malware on a mobile device according to one embodiment of the present disclosure.

FIG. 5 is a flow diagram illustrating a process 500 for the security module 115 to detect malware, according to one embodiment. Other embodiments can include different and/or additional steps than the ones described herein.

The security module 115 monitors 510 applications running on the mobile device 110 to detect suspicious actions in real-time. Once the security module 115 detects a suspicious action, the security module 115 suspends (or blocks) 520 the detected suspicious action, collected relevant information, and transmits 530 the collected information to the security system 120. The security module 115 subsequently receives 540 security score of the application from the security system 120, and determines 550 whether the application is malware and whether to allow the suspicious action to continue based on the security score. Depending on the security score, the security module 115 may allow the application to continue with or without alerting the user of the suspicious action, prompt the user for an explicit authorization of the suspicious action before allowing the application to continue, or terminate the application and delete it from the mobile device 110. In one embodiment, in addition to (or instead of) communicating with the security system 120 for the security rating, the security module 115 also applies one or more local security rules to determine the security score itself (e.g., when the security system 120 cannot be reached or is nonresponsive).

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for detecting malware on a mobile device. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for detecting a malicious application on a mobile device, comprising:
    detecting a suspicious action performed by an application running on the mobile device, the suspicious action attempting to access a mobile feature of the mobile device, the suspicious action comprising a sequence of actions involving accessing a mobile information store of the mobile device and creating a network connection;
    suspending the suspicious action performed by the application;
    collecting information about the suspicious action and the application;
    transmitting the collected information to a remote computer through a wireless network;
    receiving a security rating of the application, from the remote computer, through the wireless network, the security rating comprising a measurement of a likelihood of the application for being malware; and
    determining whether the application is malware based on the security rating.

2. The computer-implemented method of claim 1, wherein the mobile feature comprises one of the following: sending a SMS (Short Message Service) or MMS (Multimedia Messaging Service) message, initiating a telephone call, accessing a phone book or a contact list, accessing a digital wallet, initiating a network connection, accessing Bluetooth, accessing IrDA (Infrared Data Adapter), accessing WiFi (Wireless Fidelity), accessing an on-device GPS (Global Positioning System) sensor, accessing an on-device motion sensor, accessing an on-device camera, and accessing an on-device microphone.

3. The computer-implemented method of claim 1, wherein the collected information comprises: a timing of the suspicious action, a frequency of the suspicious action, and a fingerprint of the application.

4. The computer-implemented method of claim 1, further comprising:
    resuming the suspicious action performed by the application based on the security rating.

5. The computer-implemented method of claim 1, further comprising:
    resuming the suspicious action performed by the application and displaying an alert about the suspicious action based on the security rating.

6. The computer-implemented method of claim 1, further comprising:
    displaying an alert about the suspicious action and prompting a user for an user authorization to perform the suspicious action based on the security rating; and
    resuming the suspicious action performed by the application responsive to receiving the user authorization to perform the suspicious action.

7. The computer-implemented method of claim 1, further comprising:
    terminating the application and removing the application from the mobile device based on the security rating.

8. The computer-implemented method of claim 1, further comprising:
    applying a local security rule to the collected information to determine the security rating.

9. The computer-implemented method of claim 1, wherein the mobile device comprises a mobile phone.

10. A mobile device for detecting a malicious application on the mobile device, comprising:
    a non-transitory computer-readable storage medium storing executable computer program code, the computer program code comprising program code for:
        detecting, in real time, a suspicious action performed by an application running on the mobile device, the suspicious action attempting to access a mobile feature of the mobile device, the suspicious action comprising a sequence of actions involving accessing a mobile information store of the mobile device and creating a network connection;
        suspending the suspicious action performed by the application to prevent the application from accessing the mobile feature of the mobile device;
        collecting information about the suspicious action and the application;
        transmitting the collected information to a remote security system through a wireless network;
        receiving a security rating of the application from the remote security system through the wireless network, the security rating comprising a measurement of a likelihood of the application being malware and being determined responsive to an analysis of the collected information;
        determining whether to allow the suspended suspicious action to continue based on the security rating; and
        allowing the application running on the mobile device to perform the suspended suspicious action responsive to a determination to allow the suspicious action to continue based on the security rating.

11. The mobile device of claim 10, wherein the mobile feature comprises one of the following: sending a SMS (Short Message Service) or MMS (Multimedia Messaging Service) message, initiating a telephone call, accessing a phone book or a contact list, or accessing a digital wallet.

12. The mobile device of claim 10, wherein the collected information comprises: a timing of the suspicious action, a frequency of the suspicious action, and a fingerprint of the application.

13. The mobile device of claim 10, wherein the mobile device comprises a mobile phone.

14. A non-transitory computer-readable storage medium encoded with executable computer program code for detecting a malicious application on a mobile device, the computer program code comprising program code for:
    detecting, in real time, a suspicious action performed by an application running on the mobile device, the suspicious action attempting to access a mobile feature of the mobile device, the suspicious action comprising a sequence of actions involving accessing a mobile information store of the mobile device and creating a network connection;
    suspending the suspicious action performed by the application to prevent the application from accessing the mobile feature of the mobile device;
    collecting information about the suspicious action and the application;
    transmitting the collected information to a remote security system through a wireless network;
    receiving a security rating of the application from the remote security system through the wireless network, the security rating comprising a measurement of a likelihood of the application being malware and being determined responsive to an analysis of the collected information;

determining whether to allow the suspended suspicious action to continue based on the security rating; and allowing the application running on the mobile device to perform the suspended suspicious action responsive to a determination to allow the suspicious action to continue based on the security rating.

15. The non-transitory computer-readable storage medium of claim 14, wherein the mobile feature comprises one of the following: sending a SMS (Short Message Service) or MMS (Multimedia Messaging Service) message, initiating a telephone call, accessing a phone book or a contact list, or accessing a digital wallet.

16. The non-transitory computer-readable storage medium of claim 14, wherein the collected information comprises: a timing of the suspicious action, a frequency of the suspicious action, and a fingerprint of the application.

17. The non-transitory computer-readable storage medium of claim 14, wherein the mobile device comprises a mobile phone.

\* \* \* \* \*